United States Patent
Maier-Landgrebe

(10) Patent No.: US 7,455,048 B2
(45) Date of Patent: Nov. 25, 2008

(54) METHOD FOR OPERATING AN INTERNAL COMBUSTION ENGINE, AND A CONTROL DEVICE THEREFOR

(75) Inventor: Rolf Maier-Landgrebe, Kernen (DE)

(73) Assignee: Robert Bosch GmbH, Stuttgart (DE)

( * ) Notice: Subject to any disclaimer, the term of this patent is extended or adjusted under 35 U.S.C. 154(b) by 105 days.

(21) Appl. No.: 11/787,004

(22) Filed: Apr. 13, 2007

(65) Prior Publication Data

US 2007/0250288 A1 Oct. 25, 2007

(30) Foreign Application Priority Data

Apr. 24, 2006 (DE) .................... 10 2006 018 958

(51) Int. Cl.
*F02D 41/24* (2006.01)
(52) U.S. Cl. .................... 123/436; 123/673; 123/674
(58) Field of Classification Search ............ 123/436, 123/673, 674
See application file for complete search history.

(56) References Cited

U.S. PATENT DOCUMENTS

| | | | |
|---|---|---|---|
| 5,861,553 A * | 1/1999 | Janetzke et al. | 73/114.04 |
| 5,955,663 A * | 9/1999 | Ries-Muller et al. | 73/114.03 |
| 6,209,519 B1 * | 4/2001 | Melchior et al. | 123/406.24 |
| 6,273,062 B1 * | 8/2001 | Bayerl | 123/336 |
| 6,439,039 B1 * | 8/2002 | Davison et al. | 73/114.62 |
| 6,694,960 B2 * | 2/2004 | Hess et al. | 123/673 |
| 6,837,100 B1 * | 1/2005 | Lehner et al. | 73/114.03 |
| 7,293,545 B2 * | 11/2007 | Dietl et al. | 123/299 |

\* cited by examiner

*Primary Examiner*—Erick Solis
(74) *Attorney, Agent, or Firm*—Kenyon & Kenyon LLP

(57) ABSTRACT

A method of monitoring proper operation of an internal combustion engine by analyzing an engine speed includes the following steps: determination of an acceleration characteristic for each cylinder, which is a function of the engine acceleration between preferably directly successive working cycles of a specifiable number of examined cylinders; selection of the acceleration characteristics of one or a plurality of cylinders on the basis of specifiable criteria; and modification of an error characteristic provided for each examined cylinder as a function of the acceleration characteristic assigned to the cylinder, if an acceleration characteristic assigned to the cylinder has been selected.

12 Claims, 1 Drawing Sheet

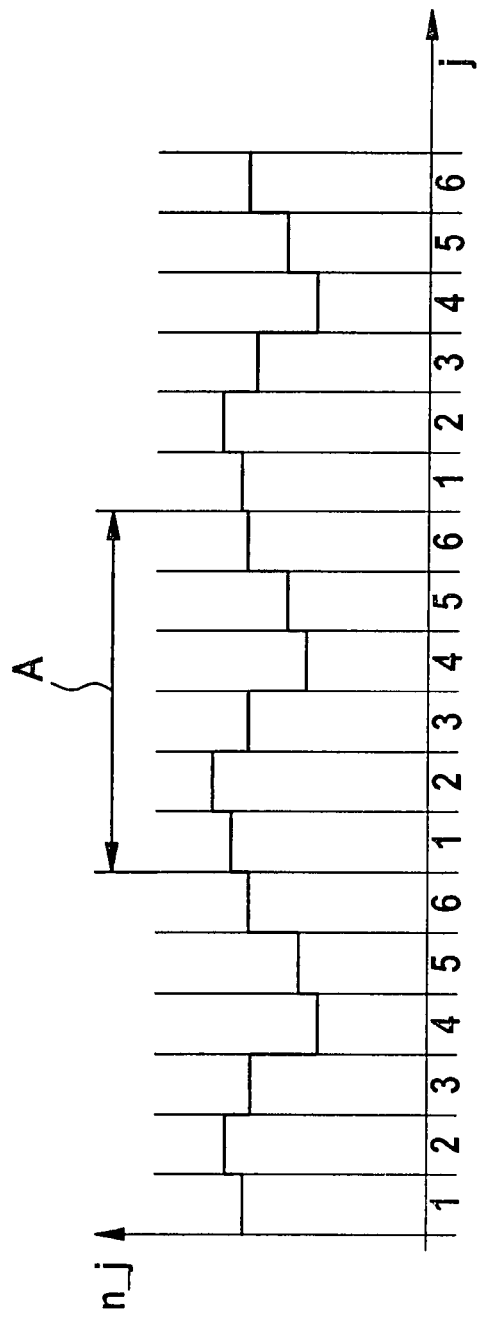
Fig. 1a
Fig. 1b
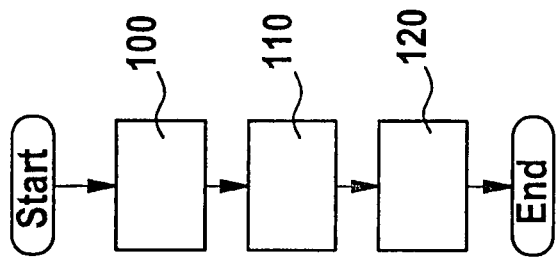
Fig. 2
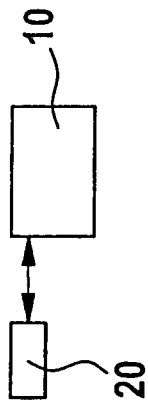
Fig. 3

METHOD FOR OPERATING AN INTERNAL COMBUSTION ENGINE, AND A CONTROL DEVICE THEREFOR

BACKGROUND OF THE INVENTION

1. Field of the Invention

The present invention relates to a control device and a method for operating an internal combustion engine, in which an engine speed of the internal combustion engine is analyzed in order to monitor proper operation.

2. Description of Related Art

Operating methods of the aforementioned type are known and used to detect misfires or leakages of the fuel system, for example. Since hydrocarbons may reach the environment as a result of misfires and the related faulty exhaust gas conditioning, provisions in the law already require the detection of misfires in the operation of an internal combustion engine.

Known methods of the type mentioned in the introduction are based on detecting a sudden decrease in the engine speed due to the lack of combustion in an affected cylinder. In the process, it is typically checked whether the engine speed or its change over time drops below a corresponding applicable threshold value. However, since the measured engine speed of an internal combustion engine is not solely a function of the combustion but of a multitude of other influence variables as well, such as errors in a pulse-generating wheel for measuring the engine speed, crankshaft torsion and vibrations of the drive shaft, the known methods usually process the measured engine speed in such a way that, to begin with, corrections are carried out that compensate for the aforementioned effects, and an engine speed corrected in this manner is then monitored for a sudden decrease.

The correction values required for the compensation are heavily dependent on an operating point of the internal combustion engine, so that a relatively high number of correction values must be stored to monitor a large operating range of the internal combustion engine and, as the case may be, will have to be relearned during operation of the internal combustion engine. This method is very complex and computer-intensive and requires control devices that have a corresponding capacity and sufficiently large memory.

BRIEF SUMMARY OF THE INVENTION

It is an object of the present invention to provide an improved method and a control device which ensure reliable monitoring of the internal combustion engine within a large operating range with at a minimum cost. This objective is achieved by, e.g., the following steps:
- determination of an acceleration characteristic for each cylinder, which is a function of the engine acceleration between preferably directly successive working cycles of a specifiable number of cylinders considered;
- selection of the acceleration characteristics of one or a plurality of cylinder(s) on the basis of specifiable criteria; and
- modification of an error characteristic provided for each examined cylinder, as a function of the acceleration characteristic assigned to the cylinder, provided an acceleration characteristic assigned to the cylinder has been selected.

The acceleration characteristic determined according to the present invention is a measure for the engine acceleration between successive working cycles of the examined cylinders of the internal combustion engine, and they may therefore be utilized to evaluate changes in the engine speed of the internal combustion engine. In an especially advantageous manner, it is not necessary to determine as the acceleration characteristic the actual engine acceleration of the internal combustion engine as a physically precise quantity. Instead, for the further implementation of the method according to the present invention it suffices to select as acceleration characteristic a variable that is proportional to the change in the engine speed over time. In this manner, using especially little effort, the required acceleration characteristic is already able to be determined by this step of the method of the present invention. For example, it is sufficient to use as acceleration characteristic the difference between two engine speed values of working cycles that preferably follow one another directly.

According to the present invention, one or a plurality of the acceleration characteristic(s) is then selected on the basis of specifiable criteria. This provides the option, for instance, of selecting acceleration characteristics whose assigned cylinders have conspicuously high or low acceleration values, and in which, compared to a cylinder whose acceleration characteristic is not conspicuously high or low, there is a correspondingly greater likelihood that a fault has occurred, such as a leak in the fuel system or a misfire. That is to say, via the step of the present invention of selecting the acceleration characteristics, the particular cylinders are identified in which a fault appears to have occurred.

The error characteristics, provided according to the present invention, of the cylinders identified in this manner are then modified as a function of the corresponding acceleration characteristics. If conspicuous values of the acceleration characteristic of one cylinder occur often, this makes it possible, for example, to continuously modify the corresponding error characteristic in an appropriate manner, until it exceeds a predefinable threshold value.

In contrast to the conventional methods, the method according to the present invention is characterized by an especially uncomplicated determination of the variables representing the engine acceleration, and by a likewise very simple evaluation of the engine acceleration, by forming or modifying the error characteristics. Unlike the conventional methods, the method according to the present invention does not require any consideration of correction values. It is therefore possible to implement the method according to the present invention even in control devices that have only relatively limited resources as far as computing capacity and memory are concerned.

BRIEF DESCRIPTION OF THE SEVERAL VIEWS OF THE DRAWING

FIG. 1a shows the time characteristic of an engine speed averaged over the working cycle of the individual cylinder of an internal combustion engine.

FIG. 1b shows a table that assigns corresponding cylinders of the internal combustion engine to the working cycles shown in FIG. 1a.

FIG. 2 shows a simplified flow chart of an example implementation of the method according to the present invention.

FIG. 3 shows a schematic block diagram of an internal combustion engine according to the present invention.

DETAILED DESCRIPTION OF THE INVENTION

By way of example, FIG. 1a shows the characteristic of engine speed $n\_j$ of internal combustion engine 10 plotted over a plurality of working cycles j of a total of six cylinders of an internal combustion engine 10 (cf. FIG. 3). Each engine speed n_j represents engine speed values n_j averaged over one working cycle j of a cylinder of the internal combustion engine.

According to the present invention, acceleration characteristics dn_j are determined based on the engine speed values n_j from FIG. 1a, which is indicated by step 100 of the flow chart shown in FIG. 2.

An acceleration characteristic dn_j assigned to the $i^{th}$ cylinder may be determined by subtracting engine speed values n_j of two preferably directly successive working cycles j--1, j from one another, working cycle j being assigned to examined $i^{th}$ cylinder. A corresponding assignment of the six cylinders i of internal combustion engine 10 considered here by way of example, to working cycles j shown in FIG. 1a is indicated in the table of FIG. 1b. For instance, according to the table of FIG. 1b, the first working cycle (j=1) plotted in FIG. 1a is implemented by the third (i=3) of the total of six cylinders of internal combustion engine 10. A following second working cycle (j=2) is correspondingly executed by the fourth cylinder (i=4) of internal combustion engine 10, and so forth.

That is to say, within one working cycle, which is symbolically indicated by double arrow A in FIG. 1a, the difference of averaged engine speed values n_j, n_j−1 is obtained for acceleration characteristic dn_j of a cylinder executing working cycle j, i.e., $$dn\_j = n\_j - n\_j - 1.$$

For the working cycle (j=1) that lies at the beginning of working cycle A, dn__1 =n__1-n__6 results as the acceleration characteristic, utilizing engine speed n__6 from the particular working cycle occurring prior in time to examined working cycle A.

In the exemplary embodiment/implementation at hand, all six cylinders of internal combustion engine 10 are considered. Following determination 100 (FIG. 2) of acceleration characteristics dn_j of all considered cylinders of working cycle A (FIG. 1a), in step 110 (FIG. 2) specific acceleration characteristics dn_j of one or a plurality cylinder(s) are selected according to the present invention, with the aid of specifiable criteria.

In order to determine those cylinders of internal combustion engine 10 in which especially conspicuous engine accelerations occur, it is possible, for instance, to choose in step 110 as criteria for selecting the acceleration characteristic only the particular acceleration characteristic of an examined working cycle A whose value is the maximum value. This means that only the acceleration characteristic that is the highest in terms of its value, for example, is selected in step 110. This acceleration characteristic represents the greatest engine acceleration that occurred during working cycle A and, via the assignment table from FIG. 1b, is linked to the particular cylinder of the internal combustion engine that has caused the corresponding engine acceleration, for instance as a consequence of a leak in an injection valve and a resulting large fuel quantity supplied into the combustion chamber.

Following selection 110 of the maximum acceleration characteristic, an error characteristic is modified according to the present invention, cf. step 120 of the flow chart from FIG. 2. To be able to distinguish in which one of the six cylinders of internal combustion engine 10 the correspondingly selected acceleration characteristic has occurred, each cylinder is assigned its individual error characteristic. In step 120 of the method according to the present invention, the error characteristic of the particular cylinder whose acceleration characteristic has previously been selected in step 110 is modified appropriately.

Modification 120 may also be implemented by, for instance, modifying the error characteristic in question, in particular by increasing it, for example by the value of the selected acceleration characteristic or by a value that is proportional thereto.

If conspicuously high values of the engine acceleration and related correspondingly high values of the particular acceleration characteristic occur once again in a working cycle of the same cylinder during future working cycles that are examined, then the corresponding error characteristic is increased in these future working cycles as well according to step 120, so that the value of the error characteristic of the particular cylinder rises continuously.

As soon as the error characteristic of a cylinder exceeds a specifiable threshold value, a control device 20, which controls internal combustion engine 10, cf. FIG. 3, and implements the method according to the present invention, is able to enter a fault in an error memory provided for this purpose (not shown in FIG. 3).

In order to avoid the build-up of sporadic errors which, as a result of tolerances of the involved components or measuring inaccuracies or occasional faulty detections in recording the engine speed, for example, may likewise cause or simulate conspicuous engine accelerations, an error characteristic may also be reduced again, e.g., periodically. If the selection of conspicuous acceleration characteristics is implemented for each working cycle A of internal combustion engine 10, as described earlier, then a corresponding reduction of the error characteristics may also be implemented following each working cycle A. Reducing the error characteristics at longer time intervals, such as following every tenth working cycle A or the like, is conceivable as well.

To take quasi-static engine accelerations into account, i.e., an engine speed that increases continuously, for example, it may advantageously be provided that the acceleration characteristics be corrected prior to selection step 110. The correction may be implemented by, for example, subtracting the acceleration characteristic averaged over examined working cycle A $$\frac{1}{6} \cdot \sum_{j=1}^{j=6} dn\_j$$

That is to say, instead of acceleration characteristics dn_j, corrected acceleration characteristics $$dn'\_j = dn\_j - \frac{1}{6} \cdot \sum_{j=1}^{j=6} dn\_j$$

are considered for the further method steps 110, 120.

In an additional example embodiment/implementation of the method according to the present invention, it is also possible to assign two different error characteristics to each cylinder of internal combustion engine 10. In this case, the first error characteristic is modified only as a function of acceleration characteristics dn_j having negative values, and the second error characteristic is modified only as a function of acceleration characteristics dn_j having positive values.

This allows separate processing of conspicuous values of the engine acceleration according to their operational signs and to distinguish, for instance, misfires and related reductions in the engine speed from leaks in a fuel injector and increases in the engine speed that accompany them.

Within the scope of selection step 110, this example embodiment/implementation of the method according to the present invention therefore makes it possible to evaluate, for example, a maximum acceleration characteristic that occurred during examined working cycle A (FIG. 1a), as well as a minimum acceleration characteristic that occurred during the same working cycle, and, if appropriate, possibly add it to a corresponding error characteristic of the particular cylinder, or generally use it for its modification in modification step 120.

The acceleration characteristics may be processed while retaining the operational sign, i.e., for negative rotational speed differences, which correspond to a slowing of the engine speed, the associated error characteristics may also assume negative values and lead to an error detection if a specifiable minimum threshold value is not attained. As an alternative, it is also possible to examine only the amount of the negative rotational speed differences, and the modification of the corresponding error characteristics may be implemented in the same manner as for positive rotational speed differences. Depending on the computation type, corresponding threshold values or comparisons of threshold values must be implemented for the error characteristics.

Furthermore, in an additional example embodiment/implementation of the method according to the present invention, it is also possible to specify the criteria for selection 110 of the acceleration characteristics such that, for instance, the two highest values or some other specifiable number of the highest or also lowest acceleration characteristics are selected. As a result, the conspicuous engine accelerations caused by a plurality of cylinders in a single working cycle A are able to be considered simultaneously when forming the corresponding error characteristics of these cylinders.

It is also possible to use the method of the present invention only for a subset of the six cylinders provided in internal combustion engine 10. This is useful, for instance, if a previous error has occurred or was detected in a particular cylinder, the error making it superfluous to use the method according to the present invention for this cylinder.

Furthermore, such a cylinder in which the corresponding error characteristic has previously exceeded or not attained a specifiable threshold value, i.e., in which an error with regard to leakage of a fuel injector or also with regard to misfires, for example, has already been detected earlier, may be excluded from the implementation of the method according to the present invention. Among others, this reduces the number of cylinders to be examined in the selection according to step 110; in addition, other cylinders possibly operating in a faulty manner may be identified more rapidly.

Furthermore, the error characteristics of all examined cylinders may also be reset upon detection of an error in a particular cylinder.

According to another example embodiment/implementation of the method according to the present invention, modification 120 of the error characteristic of a cylinder may also be omitted if the acceleration characteristic to be used for the modification does not attain or exceeds a specifiable minimum value. This takes into account that fluctuations in the rotational speed may occur in internal combustion engine 10 that are not caused by misfires or a leakage during the fuel injection. Such fluctuations in the rotational speed may be due to, for instance, tolerances of the injection system or the like, and are excluded from the actual error detection in the present example embodiment/implementation by appropriate selection of the minimum value, thereby increasing the accuracy of the method.

One advantage of the use of the method according to the present invention is that, in contrast to the conventional methods, there is no need to arithmetically determine the actual engine acceleration. Instead, it is sufficient to provide as the described acceleration characteristic, a measure for the engine acceleration that is, for example, proportional to the engine acceleration. In a simple case, as already described, the acceleration characteristic may be formed from a difference between averaged engine speeds of successive working cycles. Furthermore, instead of averaged engine speed values $n\_j$ (FIG. 1a), it is possible to use for the subtraction individual values of the engine speed from individual working cycles j to be examined, the individual values being selected at a fixed point in time within the particular working cycle. Instead of the engine speed, a variable representing the engine speed, such as a pulse count of a rotary transducer could be evaluated as well for the purpose of forming the acceleration characteristic.

Since the method according to the present invention does not require any working-point-dependent correction of a measured engine speed, the processing or the execution of the method steps is able to be carried out in engine control device 20 in a manner that greatly spares the resources. Compared to the known methods, which have a working-point dependency, the use of the present invention results in savings, in particular with regard to the computing capacity and the memory of a processing unit provided in control device 20. For instance, the method according to the present invention may be realized in the form of a computer program, which is provided on a storage medium or program memory of control device 20.

Another advantage of the method according to the present invention is that it may be used in all operating ranges of internal combustion engine 10, without it being required that previously measured or learned compensation values for a measured engine speed or the like be available. In contrast to conventional methods where a simple threshold value decision is applied immediately following the end of a particular working cycle for detection of a misfire, to the change in the engine speed within the working cycle or relative to the preceding working cycle, for example, the method according to the present invention offers greater precision since, due to the stepwise modification 120 of the error characteristics over a plurality of working cycles A, the signal quality of an engine speed signal, which may differ substantially depending on the operating point of internal combustion engine 10, is implicitly taken into account.

At high loads in which an error such as a misfire tends to cause more pronounced changes in the engine speed over time than at low loads, errors are detected very rapidly when using the method according to the present invention, for instance within a few working cycles.

At low loads and the related less pronounced changes in the engine speed over time in the case of a fault, the error detection takes longer because of the correspondingly poorer signal quality, due to the fact that the corresponding error characteristic must be modified over a greater number of working cycles in order to lead to an error detection. However, this provides greater precision even at lower loads than in the case of conventional methods in which, to adapt the simple threshold value decision to another operating point of the internal combustion engine, the threshold value must be shifted correspondingly and the detection therefore set to be unnecessarily sensitive, for instance, which, due to the other influences, in particular influences that are not a function of working points, for example, results in errors being detected too often although no error has occurred in reality.

What is claimed is:

1. A method of monitoring operation of an internal combustion engine by evaluating an engine speed of the internal combustion engine, comprising:

determining an acceleration characteristic for each of at least a first considered cylinder and a second considered cylinder of the engine, wherein the acceleration characteristic is determined based on a difference of engine speed values of two directly successive working cycles, and wherein at least one of the two directly successive working cycles corresponds to a working cycle of one of the first considered cylinder and the second considered cylinder;

selecting the acceleration characteristic of at least one of the first considered cylinder and the second considered cylinder based on at least one specified criterion; and modifying at least one error characteristic provided for the cylinder having the selected acceleration characteristic, wherein the modification is based on the selected acceleration characteristic.

2. The method as recited in claim 1, wherein each of the engine speed values of two directly successive working cycles used for determining the acceleration characteristic is an average engine speed value over a corresponding working cycle.

3. The method as recited in claim 2, wherein the selection of the acceleration characteristic of at least one of the first considered cylinder and the second considered cylinder is based on comparisons of the acceleration characteristics of the first considered cylinder and the second considered cylinder to a specified threshold value.

4. The method as recited in claim 2, wherein, in the selecting step, only the acceleration characteristic having one of the lowest value and the highest value is selected.

5. The method as recited in claim 2, wherein, in the modification step, the at least one error characteristic provided for the cylinder having the selected acceleration characteristic is one of increased or decreased by an adjustment amount based on the selected acceleration characteristic.

6. The method as recited in claim 2, wherein, in the modification step, the at least one error characteristic provided for the cylinder having the selected acceleration characteristic is modified by an adjustment amount based on the selected acceleration characteristic only if the adjustment amount satisfies a specified threshold.

7. The method as recited in claim 2, wherein a first error characteristic and a second error characteristic are provided for each of the first considered cylinder and a second considered cylinder, and wherein in the modification step, the first error characteristic is modified only as a function of an acceleration characteristic having a negative value, and the second error characteristic is modified only as a function of an acceleration characteristic having a positive value.

8. The method as recited in claim 2, wherein the at least one error characteristic provided for the cylinder having the selected acceleration characteristic is periodically modified by a specified value.

9. The method as recited in claim 2, wherein an error in the operation of one of the first considered cylinder and the second considered cylinder is inferred if the corresponding error characteristic assigned to one of the first considered cylinder and the second considered cylinder does not satisfy a specified threshold condition.

10. The method as recited in claim 2, wherein the engine has at least one additional cylinder in addition to the first considered cylinder and the second considered cylinder, and wherein the acceleration characteristics are determined only for the first considered cylinder and the second considered cylinder for which no previous error has been inferred.

11. A computer-readable storage medium storing a computer-executable program configured to perform, when executed on a computer, a method of monitoring operation of an internal combustion engine by evaluating an engine speed of the internal combustion engine, comprising:

determining an acceleration characteristic for each of at least a first considered cylinder and a second considered cylinder of the engine, wherein the acceleration characteristic is determined based on a difference of engine speed values of two directly successive working cycles, and wherein at least one of the two directly successive working cycles corresponds to a working cycle of one of the first considered cylinder and the second considered cylinder;

selecting the acceleration characteristic of at least one of the first considered cylinder and the second considered cylinder based on at least one specified criterion; and modifying at least one error characteristic provided for the cylinder having the selected acceleration characteristic, wherein the modification is based on the selected acceleration characteristic.

12. A control device for monitoring operation of an internal combustion engine by evaluating an engine speed of the internal combustion engine, comprising:

means for determining an acceleration characteristic for each of at least a first considered cylinder and a second considered cylinder of the engine, wherein the acceleration characteristic is determined based on a difference of engine speed values of two directly successive working cycles, and wherein at least one of the two directly successive working cycles corresponds to a working cycle of one of the first considered cylinder and the second considered cylinder;

means for selecting the acceleration characteristic of at least one of the first considered cylinder and the second considered cylinder based on at least one specified criterion; and means for modifying at least one error characteristic provided for the cylinder having the selected acceleration characteristic, wherein the modification is based on the selected acceleration characteristic.

* * * * *